March 10, 1970  P. W. HAIT  3,499,669
SPHERICAL CONNECTOR HAVING VACUUM LINES JOINED THERETO
VIA WELDED JOINTS INTERNAL OF THE SPHERE
Filed Feb. 19, 1968
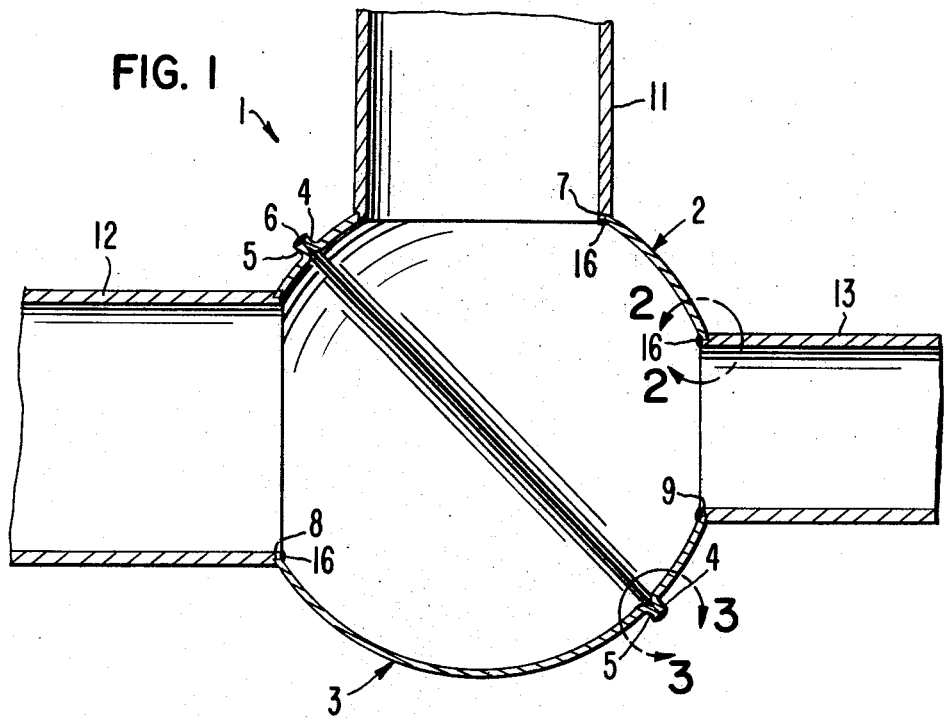
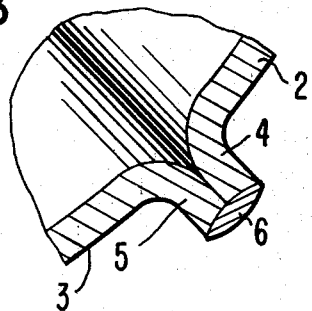
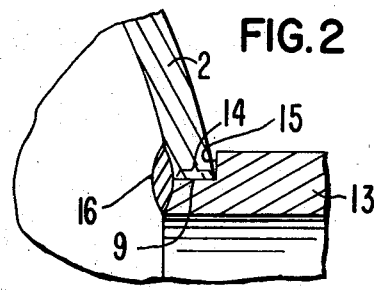
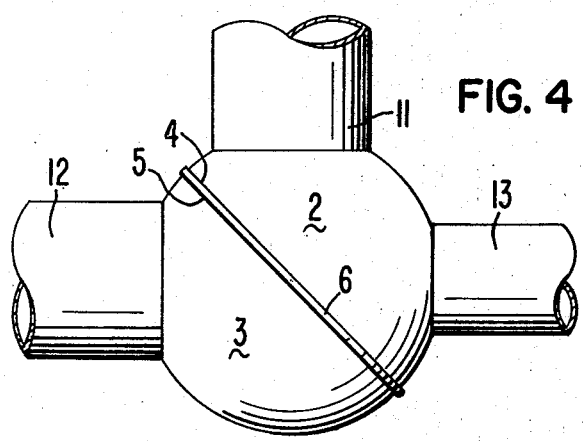
INVENTOR.
PAUL W. HAIT
BY
Leon F. Herbert
ATTORNEY

United States Patent Office 3,499,669
Patented Mar. 10, 1970

3,499,669
SPHERICAL CONNECTOR HAVING VACUUM LINES JOINED THERETO VIA WELDED JOINTS INTERNAL OF THE SPHERE
Paul W. Hait, Beaverton, Oreg., assignor to Varian Associates, Palo Alto, Calif., a corporation of California
Filed Feb. 19, 1968, Ser. No. 706,490
Int. Cl. F16l *41/00, 5/00, 21/00*
U.S. Cl. 285—189                           2 Claims

ABSTRACT OF THE DISCLOSURE

A spherical vacuum manifold connector structure is disclosed. The spherical vacuum connector is formed by a pair of sheet metal hemispheres having mating lip portions sealed together in a vacuum tight manner to form a hollow sheet metal sphere. The sphere has at least two circular openings therein with a vacuum pipe communicating with each of the circular openings. The vacuum pipes extend through the circular openings and are joined to the sphere by means of a continuous weld disposed on the inside of the sphere between the inside marginal edge of the circular openings and the inner ends of the vacuum pipes. In this manner, vacuum tight welds in a relatively thin walled vacuum manifold connector are obtained. In a preferred embodiment, the two hemispherical portions of the sheet metal sphere include outwardly flared lip portions which are joined together by means of a continuous peripheral weld. The vacuum pipes preferably include an external shoulder for mating with the outside marginal edge of the circular openings in the sphere to facilitate proper positioning of the vacuum pipes for welding thereof.

DESCRIPTION OF THE PRIOR ART

Heretofore, vacuum pipes in high vacuum plumbing have been connected or manifolded by means of standard fittings such as T's, elbows, Y's, reducers, and combinations thereof. The use of such standard fittings greatly increases the complexity and total path length of plumbing connections to be made between a number of different pieces of vacuum equipment. Moreover, such standard fittings are relatively expensive.

In the high pressure fluid manifold art, it has previously been proposed to use a spherical pressure manifold having high pressure fluid lines joined to the manifold by means of continuous welds. More specifically, U.S. Patent No. 3,186,431 issued June 1, 1965 proposes to make a high pressure spherical manifold by cutting circular holes in two hemispherical members. The holes were to have the same inside diameter as the inside diameter of the pipes to be joined to the spherical manifold. The two hemispheres are then welded together by means of a full penetration weld formed between bevelled lips of the mating hemispheres. The ends of the pipes were bevelled and full penetration welds were made between the outside marginal edge of the openings in the sphere and the bevelled outer surface of the high pressure pipes to join the pipes to the sphere.

While the use of a spherical manifold greatly reduces the complexity of the plumbing required to interconnect a number of different pipes and while the sphere can offer many other advantages, as a plumbing connection or manifold unit, the use of external full penetration welds for welding vacuum pipes to a spherical vacuum manifold structure is unsuitable. It is unsuitable due to the trapping of pockets of gas in the welded seams and the production of virtual leaks in such external welded seams. Moreover, these external welded seams are very difficult to make on the relatively thin wall tubing used in the vacuum art as compared to the relatively thick walled pipes and spheres utilized in the high fluid pressure art.

Therefore, a need exists for an improved vacuum manifold which will greatly facilitate and simplify the interconnection of a number of different vacuum pipes intersecting at various different angles and which will be free of trapped pockets of gas and virtual leaks.

SUMMARY OF THE PRESENT INVENTION

The principal object of the present invention is the provision of an improved vacuum connector.

One feature of the present invention is the provision, in a spherical vacuum connector, of a pair of sheet metal hemispheres sealed together in a vacuum tight manner at their edges or lips to form a sphere, the sphere having at least two circular openings therein with a vacuum pipe communicating with each of the circular openings and extending through the openings, and including continuous welded seams disposed on the inside of the hollow sphere between the inside marginal edge of the circular openings and the inner ends of the vacuum pipes, whereby vacuum tight joints are produced between the hollow sphere and the vacuum pipes.

Another feature of the present invention is the same as the preceding feature wherein the adjoining lip portions of the sheet metal hemispheres are outwardly flared and the mating lip portions of the hemispheres are joined together by means of a continuous peripheral seal at the outer periphery of the mated flared lip portions, whereby a vacuum tight joint is produced between the pair of sheet metal hemispheres.

Another feature of the present invention is the same as any one or more of the preceding features wherein the vacuum pipes include an external shoulder which engages the outer marginal lip portions of the circular openings in the sphere, whereby positioning of the vacuum pipes for welding is facilitated and the reduced thickness of the inner ends of the vacuum pipes facilitates forming of the internal welds.

Other features and advantages of the present invention will become apparent upon a perusal of the following specification taken in connection with the accompanying drawings wherein:

BRIEF DESCRIPTION OF THE DRAWINGS

FIG. 1 is a cross sectional view of a spherical vacuum manifold connector incorporating features of the present invention, FIG. 2 is an enlarged sectional view of a portion of the structure of FIG. 1 delineated by line 2—2, FIG. 3 is an enlarged detailed sectional view of a portion of the structure of FIG. 1 delineated by line 3—3, and FIG. 4 is a reduced side elevational view of the structure of FIG. 1 taken in the same direction as FIG. 1.

DESCRIPTION OF THE PREFERRED EMBODIMENT

Referring no to FIG. 1, there is shown a high vacuum spherical manifold connector 1 incorporating features of the present invention. The vacuum manifold connector 1 includes a pair of sheet metal hemispheres 2 and 3 disposed in mutually opposed relation with their lip portions 4 and 5 disposed in abutting relation and sealed together at their outer periphery by a continuous peripheral weld 6 to form a vacuum tight joint therebetween. The vacuum tight joint is more fully described below with regard to FIG. 3.

The sheet metal hemispheres 2 and 3 are preferably made of a suitable vacuum material such as 304 stainless steel which is relatively easy to weld and which has low outgassing properties at high vacuum, i.e., pressures less than $10^{-6}$ torr. Suitable wall thicknesses for the sheet metal hemispheres 2 and 3 range between 0.040" and 0.060" depending upon the diameter of the sphere formed by the hemispheres.

Circular openings 7, 8 and 9 are cut through the wall of the hemispheres 2 and 3 as by rotoboring. When the axis of the opening intersects with the center of the sphere, i.e., passes along a radius of the sphere, the opening will be circular regardless of its diameter. The circular openings 7, 8, and 9 have diameters slightly larger than the inside diameters of three vacuum pipes 11, 12 and 13 which are to be connected to the spherical connector 1. The pipes 11, 12 and 13 are fitted through the openings 7, 8 and 9, respectively, and the inner ends of the pipes are welded at 16 to the inner marginal lip portions of the openings 7, 8 and 9 on the inside of the spherical connector 1.

Referring now to FIG. 2, the details of the welds 16 are more clearly shown. The vacuum pipe 13 is typically made of a suitable high vacuum material such as 304 stainless steel and typically has a wall thickness falling within the range of 0.060" to 0.090". The inner end of the pipe 13 has its outside diameter cut down to approximately half the wall thickness of the remaining portion of the pipe 13. This provides a region of decreased outside diameter 14 which is slightly greater in axial extent than the wall thickness of the hemisphere 2. The outside diameter of the turned down region 14 is approximately equal to the inside diameter of the opening 9 in the hemisphere 2. The turned down region 14 thereby forms an external shoulder 15 for abutting the outside marginal lip portion of the aperture 9 in the hemisphere 2. In this manner, the turned down region 14 together with the shoulder 15 serves to properly position the inner end of the pipe 13 such that it just slightly protrudes inwardly of the hemisphere 2, thereby facilitating formation of the continuous welded seam 16 between the inner end of the pipe 13 and the inside marginal lip of the aperture 9. The welded seam 16 is preferably formed by fusing the marginal lip of the aperture 9 to the end of the pipe 13. The remaining pipes 11 and 12 are joined in a similar manner to the respective apertures in the hemispheres 2 and 3.

Referring now to FIG. 3, there is shown the details of the vacuum tight joint between the two marginal lip portions 4 and 5 of the hemispheres 2 and 3, respectively. The lip portions 4 and 5 are outwardly flared such that the inside surfaces of the outwardly flared lips 4 and 5 are substantially parallel to a plane perpendicular to the axis of revolution of each of the hemispherical sections 2 and 3. The peripheral welded seam 6 is formed by fusing the lips 4 and 5 together at their abutting marginal surfaces. In this manner, the fused material is drawn into the seam between the abutting surfaces of the lip portions to provide a vacuum tight joint which is free of trapped gas pockets.

Referring now to FIG. 4, there is shown the vacuum manifold connecter 1 of the present invention. The connector 1 is shown for connecting together three pipes 11, 12 and 13 having different diameters. Use of the internal welded seams 16 for joining the vacuum pipes 11, 12 and 13 to the hemispherical sections 2 and 3 provides a gas tight connection which is free of trapped gas pockets and which does not contain virtual leaks. Use of the internal welded seam construction is especially useful for welding the relatively thin walled pipes and hemispheres together since the prior external welded construction is relatively difficult to employ with such thin walled tubing and sheet metal parts. The seams of the spherical connector 1 have a leak rate less than $10^{-10}$ cc. of Helium/sec. at standard atmospheric pressure.

Although three pipes have been depicted as connected into the hemispheres 2 and 3, substantially any number of pipes may be similarly connected to the hemispheres 2 and 3, provided sufficient surface area on the hemispheres is available to accommodate the pipes. The pipes 11, 12 and 13 may include suitable flange couplers, not shown, for coupling the relatively short lengths of pipe depicted in FIG. 4 to other sections of pipe communicating with the various devices to be interconnected. Alternatively, the short sections of pipes 11, 12 and 13 may be merely welded or joined in a similar manner in a vacuum tight way to other sections of pipe communicating with the devices to be interconnected.

During the fabrication of the spherical vacuum manifold connector 1, the pipes 11, 12 and 13 are preferably welded into the hemispherical sections 2 and 3 before the hemispheres are joined together by the weld 6. In this manner, access to the internal weld seams 16 is readily obtained through the open lip of the hemispherical sections 2 and 3.

The spherical connector 1 of the present invention provides higher gas conductance to the flow of gas therethrough than obtainable from a standard elbow fitting of equivalent length. Moreover, the spherical connector 1 has less internal surface area for a given conductance than an equivalent sized elbow fitting. As a result, less unwanted outgassing of the internal surfaces of the connector 1 is obtained, in use, as compared to the use of standard pipe fittings.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a vacuum connector for connecting plural vacuum pipes, means forming a pair of sheet metal members having a thickness of .060 inch or less and being of generally hemispherical shape, disposed in mutually opposed relation and joined together at their edges by a vacuum tight connection, thus forming a hollow sheet metal connector, said connector having at least two circular openings therein, said openings being spaced from the edges of said hemispherical members as not to intercept any portion of the sealed connection between said hemispherical members, a vacuum pipe communicating with each of said circular openings in said hollow connector, said pipes being secured to the lip portions of said circular openings by continuous welds, said vacuum pipes extending through the circular openings in said hollow connector, and said continuous welds being disposed on the inside of said hemispherical members between the inside marginal edge of said circular openings and the inner end of said vacuum pipes, the edges of said sheet metal hemispherical members being outwardly flared of said hemispheres and being mated in contiguous relation, and a continuous seal formed at the outer periphery of the mated flared edges for providing a vacuum tight connection between said pair of sheet metal hemispherical members, said vacuum pipes having a region of reduced outside diameter axially coextensive with the thickness of the sheet metal of said hemispherical members to provide an external shoulder disposed in engagement with the outer marginal lip of said circular openings in said hemispheres for limiting the inward travel of the vacuum pipes through said circular openings, whereby positioning of the vacuum pipes for welding is facilitated and the resultant reduced thickness of the inner ends of said vacuum pipes facilitates formation of the internal welds, and wherein said continuous welds include weld beads between said pipes and said circular openings which occupy the entire inner end area of said pipes.

2. In a vacuum connector for connecting plural vacuum pipes, means forming a pair of sheet metal members having a thickness of .060 inch or less and being of generally hemispherical shape, disposed in mutually opposed relation and joined together at their edges by a vacuum tight connection, thus forming a hollow sheet metal connector, said connector having at least two circular openings therein, said openings being spaced from the edges of said hemispherical members as not to intercept any portion of the sealed connection between said hemispherical members, a vacuum pipe communicating with each of said circular openings in said hollow connector, said pipes being secured to the lip portions of said circular openings by continuous welds, said vacuum pipes extending through the circular openings in said hollow connector, and said continuous welds being disposed on the inside of said hemispherical members between the inside marginal edge of said circular openings and the inner end of said vacuum pipes, the edges of said sheet metal hemispherical members being mated in contiguous relation, and a continuous seal formed at the outer periphery of the mated edges for providing a vacuum tight connection between said pair of sheet metal hemispherical members, said vacuum pipes having a region of reduced outside diameter axially coextensive with the thickness of the sheet metal of said hemispherical members to provide an external shoulder disposed in engagement with the outer marginal lip of said circular openings in said hemispheres for limiting the inward travel of the vacuum pipes through said circular openings, whereby positioning of the vacuum pipes for welding is facilitated and the resultant reduced thickness of the inner ends of said vacuum pipes facilitates formation of the internal welds, and wherein said continuous welds include weld beads between said pipes and said circular openings which occupy the entire inner end area of said pipes.

References Cited

UNITED STATES PATENTS

| | | | |
|---|---|---|---|
| 2,807,445 | 9/1957 | Gardner | 285—286 X |
| 685,876 | 11/1901 | Shields | 285—156 X |
| 1,299,396 | 4/1919 | Coleman | 285—189 |
| 1,947,196 | 2/1934 | Frank | 285—286 X |
| 2,763,923 | 9/1956 | Webb | 285—286 X |
| 3,003,227 | 10/1961 | Haag | 285—286 X |
| 3,026,130 | 3/1962 | Morrell | 285—201 |
| 3,186,431 | 1/1965 | Moore | 285—156 X |
| 3,236,341 | 2/1966 | Chopinet et al. | 285—286 X |

DAVID J. WILLIAMOWSKY, Primary Examiner

D. W. AROLA, Assistant Examiner

U.S. Cl. X.R.

285—156, 286, 424